Dec. 4, 1956 — T. ASTI — 2,772,689
MILKING MACHINE TIMING DEVICE
Filed Jan. 22, 1952 — 5 Sheets-Sheet 1

INVENTOR.
Theodore Asti
BY Wallace and Cannon
ATTORNEYS

Dec. 4, 1956 T. ASTI 2,772,689
MILKING MACHINE TIMING DEVICE
Filed Jan. 22, 1952 5 Sheets-Sheet 2

INVENTOR.
Theodore Asti
BY
Wallace and Cannon
ATTORNEYS

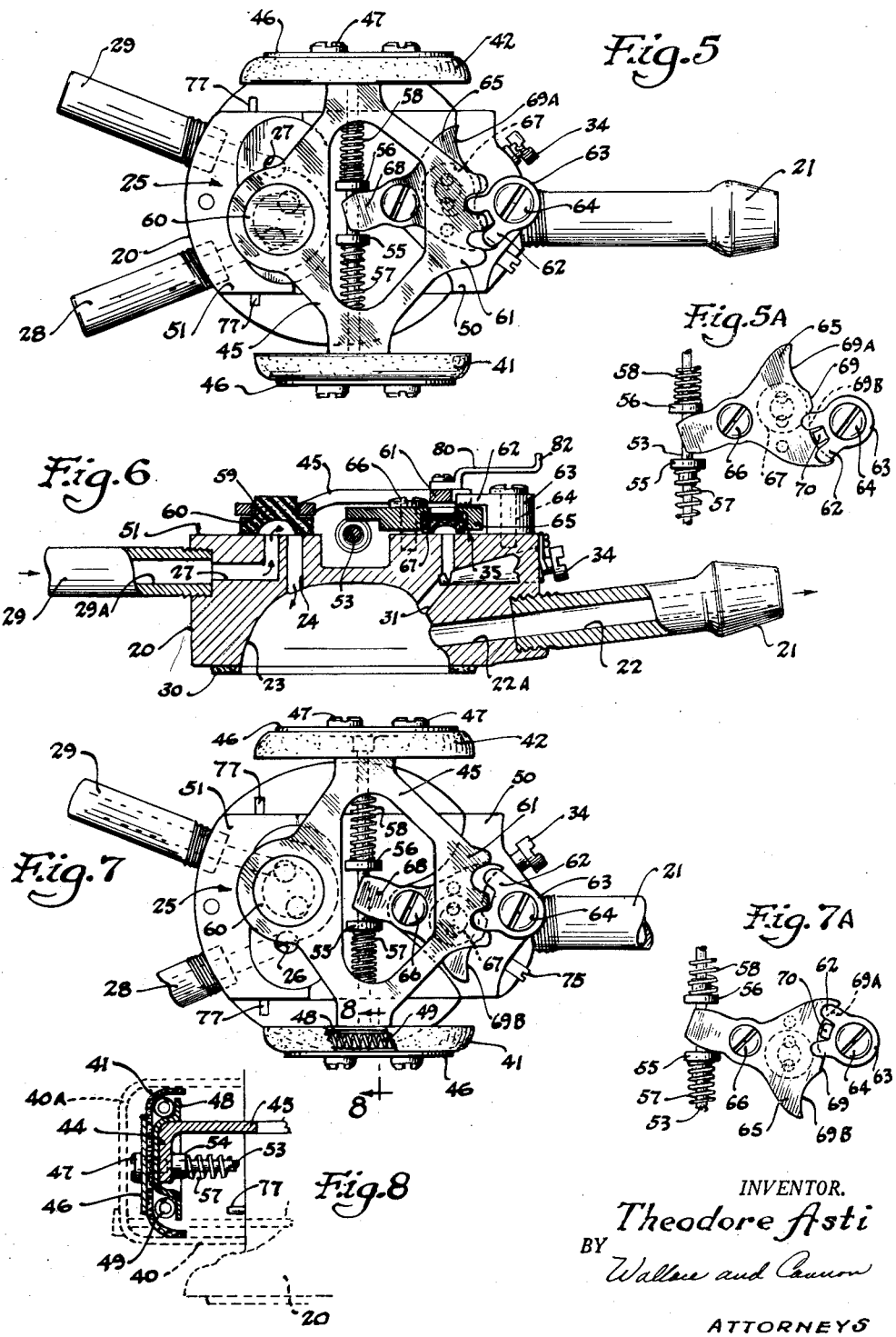

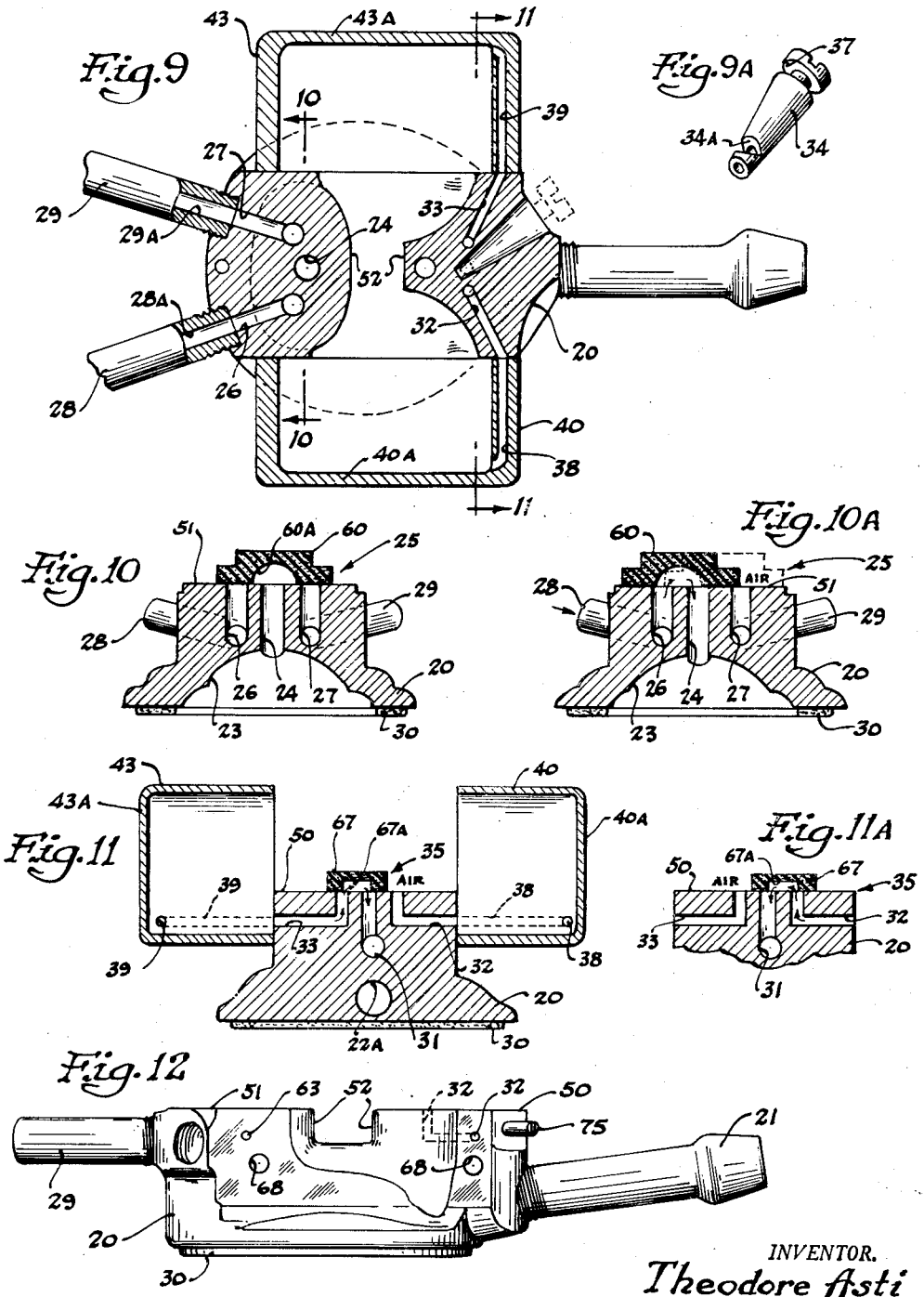

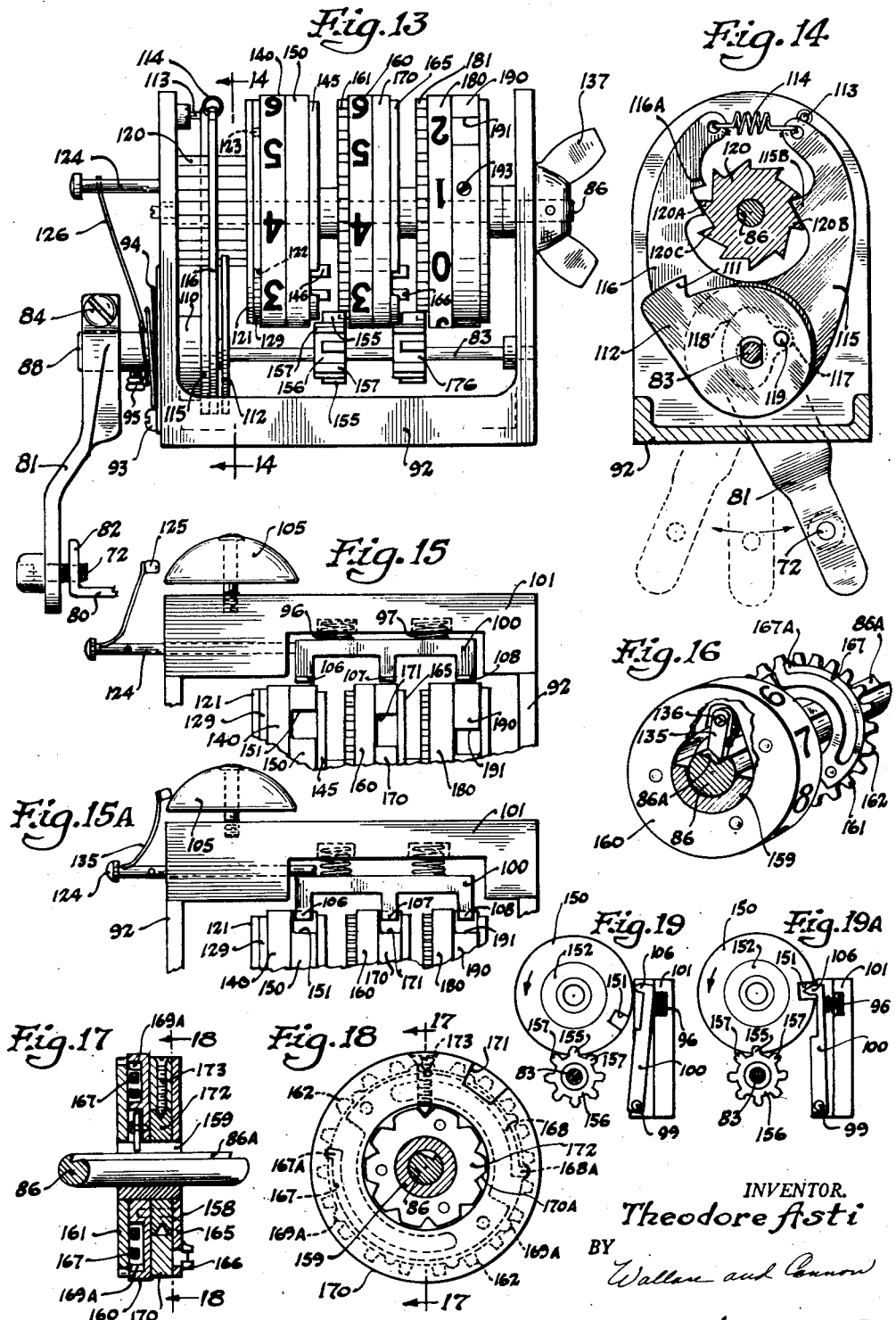

United States Patent Office 2,772,689
Patented Dec. 4, 1956

2,772,689

MILKING MACHINE TIMING DEVICE

Theodore Asti, Milwaukee, Wis.

Application January 22, 1952, Serial No. 267,570

14 Claims. (Cl. 137—103)

This invention relates to a pulsator milking device, and more particularly to that type in which means are afforded to impart vacuum pulses to the cup clusters attached to the teats of the cow.

The milking device of the present invention embodies a cyclically shiftable or pulsating motor adapted to control milking pulses, and it is an object of this invention to afford means for counting the number of milking pulses applied to the teat cups, rather than the length of time of milking, and to interrupt such pulses at a predetermined number. It is a further object of this invention to afford means whereby the counter is actuated once for each cycle of the motor.

When milking by means of a vacuum-actuated device, it is desirable that the attendant be free to perform other duties while being assured that the cows will not be over-milked, and it is a further object of the present machine to afford means for automatically interrupting and discontinuing milking at a predetermined number of milking pulses or cycles of the motor. Moreover, since the attendant may be indisposed or at a remote location at the moment, it is a further object of this invention to afford means whereby the vacuum in the cup lines is locked at a predetermined number of milking pulses and maintained until such time as the attendant is disposed to remove the cups from the teats of the cow.

Another object of this invention is to afford means that cooperate with the counter to interrupt shifting of a vacuum-actuated motor at a predetermined number of cycles of the latter, and a further object is to interrupt the motor at such a point in its cycle that vacuum in the teat cup lines is locked and maintained.

Yet further objects of the present invention are to permit attainment of the foregoing objects by means of novel arrangements in a counter mechanism and sliding valve, and to devise means cooperating therewith for interrupting the moving parts at a predetermined number of pulses to effectively and positively lock the vacuum in the teat cups whereby the latter are maintained in position on the teats after the cow has been milked.

Other objects of the present invention will be apparent from the following description and claims and are depicted in the drawings which, by way of illustration, show a preferred embodiment of the present invention and the principle thereof and what I now consider to be the best mode in which I have contemplated applying that principle. Modifications of the present invention embodying the same or equivalent principles may be used, and structural changes may be made as desired by those skilled in the art without departing from the purview and scope of the present invention.

In the drawings:

Fig. 5 is a top plan view of the valve and piston arrangement embodied in the pulsator of the present invention;

Fig. 5A is a detail plan view, partly broken away, of certain members shown in Fig. 5;

Fig. 6 is a sectional view of the arrangement shown in Fig. 5 and taken through the valves and associated lines in the setting shown in Fig. 5;

Fig. 7 is a view similar to Fig. 5 but showing the pulsator in a different limit position of actuation;

Fig. 7A is a detail plan view, partly broken away, of certain members shown in Fig. 7;

Fig. 8 is a sectional view of one of the pistons taken substantially along the line 8—8 of Fig. 7;

Fig. 9 is a horizontal sectional view taken through the base of the milking device shown in Fig. 1 to illustrate the way in which the motor is adapted to be actuated by vacuum in the cylinders;

Fig. 9A is a detail view of a valve member;

Fig. 10 and 11 are sectional views taken substantially along the lines 10—10 and 11—11 of Fig. 9 and showing the D-valves in one condition of related operative positions;

Figs. 10A and 11A are views similar to Figs. 10 and 11 but showing the D-valves in related other operative positions;

Fig. 12 is a side elevational view of the base of the device of the present invention;

Fig. 13 is an enlarged elevational view of the counting mechanism;

Fig. 14 is a sectional view taken substantially along the line 14—14 of Fig. 13;

Fig. 15 is a fragmentary top plan view of a portion of the counting mechanism shown in Fig. 13;

Fig. 15A is a view similar to Fig. 15 but showing the lock bar in its locking position;

Fig. 16 is a detail perspective of one of the number wheels and gears of the counting mechanism;

Fig. 17 is a sectional view taken substantially along the line 17—17 of Fig. 18;

Fig. 18 is a sectional view being taken substantially along the line 18—18 of Fig. 17 and showing a settable disc in elevation; and Figs. 19 and 19A are schematic views of the locking means that cooperates with the counter mechanism.

Figure 1:
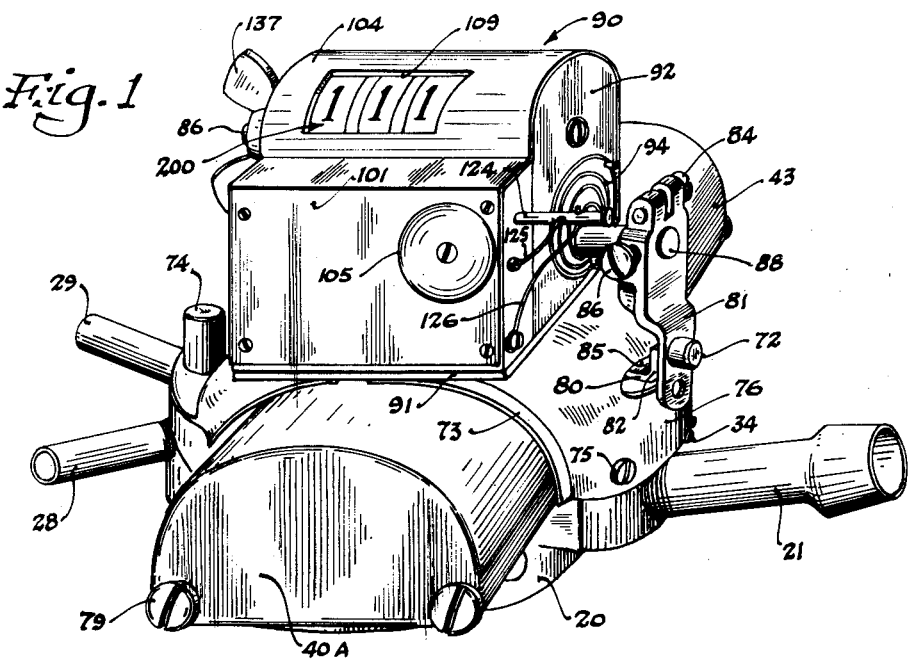
Fig. 1 is a perspective view of a milking device of the present invention.
Figure 2:
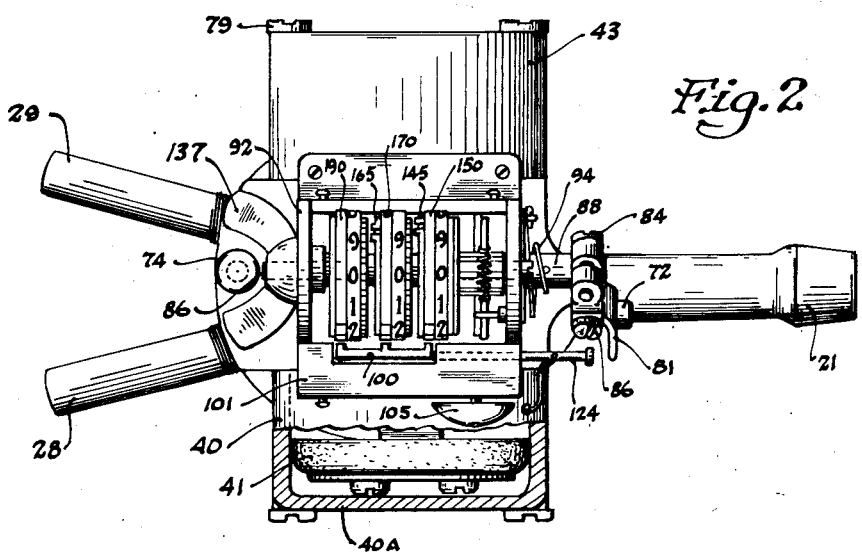
Fig. 2 is a top plan view of a milking device of the present invention with the cover for the counter mechanism removed and a piston cylinder broken away.

The milking device of the present invention illustrated in Figs. 1–19 comprises a cyclically shiftable or pulsating motor preferably in the form of a pair of pistons that slide in a pair of piston cylinders 40 and 43, Fig. 1. These cylinders are each adapted to slidably receive a piston head as 41, Fig. 2, carried at either end of a one-piece shiftable piston carrier 45, and shifting or pulsing movement of this carrier is under control of a valve 35, the valve ports of which are located adjacent one end of a base member generally indicated at 20. Valve ports of another valve 25 are located adjacent the other end of the base member 20 and this valve is controlled by the shiftable piston carrier 45 to impart vacuum pulses to the teat cups in a manner to be described below. Positioned between and overlying the piston cylinders of the motor is a counter mechanism generally indicated at 90 which is adapted to count the cyclic movements of the piston carrier. The counter mechanism is connected to the piston carrier through a shiftable or rocking counter arm 81 and a plate 80, the latter being fixed at one end to the piston carrier and provided at the other end with an upstanding yoke 82 that embraces a pin on the counter arm. As a consequence of this connection, movement of the piston carrier is imparted to the counter arm 81. As indicated in Fig. 4, the counter arm 81, during milking operation, assumes left and right limit positions indicated, respectively, by the full and extreme dotted line positions. These limit positions are also shown in Fig. 14 and coincide or correspond to the left and right limit positions of the piston carrier 45, and as indicated in Figs. 4 and 14, the counter arm 81 passes through an intermediate or central position also indicated by dotted lines. The counter mechanism embodies a lock bar 100, Fig. 2, which is adapted to be actuated at a predetermined number of milking pulses or cycles of the motor to limit movement of the arm 81 to the aforementioned central position. When this occurs, the piston carrier is held in a corresponding central or intermediate position that determines, through valve 25, holding of the vacuum in the lines terminating at the cups attached to the teats of the cow in a manner to be described in detail hereinafter. Thus, it will be seen that the milking device of the present invention is adapted to count rather than time the vacuum pulses, and that at a predetermined number of pulses or cycles of the motor, the latter is held in such a position as to terminate pulsing of the vacuum. This aspect of the present invention prevents overmilking and yet maintains the cups in position until such time as the attendant is free to remove them once a warning bell 105, under control of the lock bar 100, has been sounded.

Figure 3:
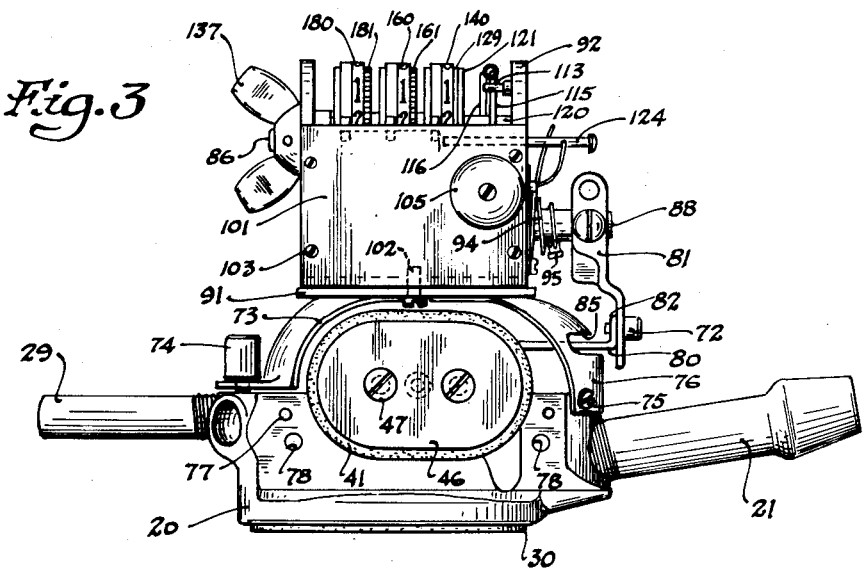
Fig. 3 is a side elevational view of the device substantially as shown in Fig. 2.
Figure 4:
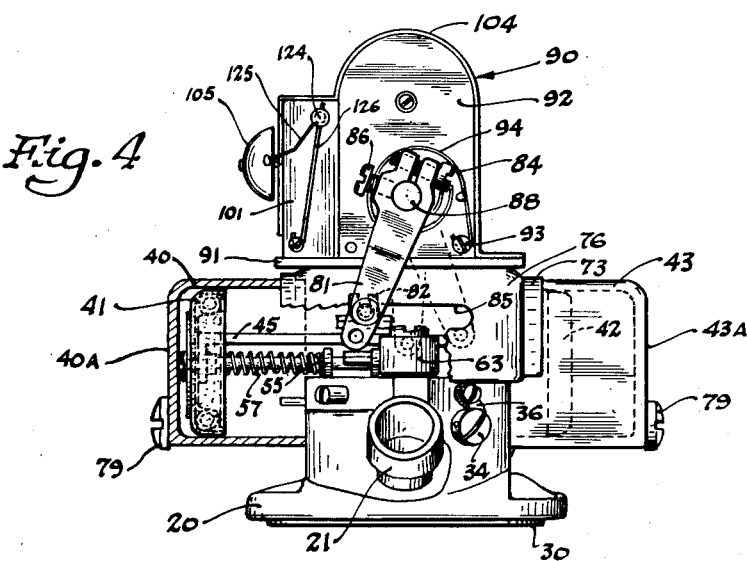
Fig. 4 is an end elevational view of the device of Fig. 3.

Referring to Figs. 1–4, a pair of piston cylinders 40 and 43 extend laterally from opposite sides of the base member 20 and are retained in position as by screws 79 received in threaded bores 78, Fig. 3. A pin as 77, Fig. 2, may be provided on either side of the base member to facilitate mounting of the piston cylinders in pisition on the sides of base member 20. As best shown in Figs. 3 and 4, a hood or cover 76 having an arcuately shaped bottom portion is mounted on the base member 20 as by screws 74 and 75, and flanges as 73 projecting from this hood rest on the tops of the piston cylinders. A flat plate 91 is secured to the top of hood 76 by means of rivets (not shown), and by means of a screw 102 this plate mounts a housing 101 for the lock bar 100. Resting on the topside of plate 91 is a housing 92 for the counter mechanism, being held in position as by screws 103 set in the lock bar housing 101. A cover 104 is provided for the housings 101 and 92, and a window 109 is afforded therein for viewing the number wheels generally indicated at 200, Fig. 1. From the foregoing it will be seen that the counter mechanism and housing for the lock bar are removable as a unit relative to the base member 20 when the screws 74 and 75 are withdrawn to permit the hood 76 to be lifted from position overlying the piston cylinders 40 and 43. Such removal exposes the underlying piston and valve arrangement shown in Figs. 5–12.

The piston and valve arrangement embodies a pair of piston heads that slide in the bores of piston cylinders which are adapted to receive vacuum pulses that actuate the piston carrier. Pulsing of the vacuum in the piston cylinders is under control of a first D-valve, and the shiftable piston carrier also carries a valve disc for a second D-valve that pulses vacuum to the lines connected to the teat cups. It will thus be seen that the first D-valve indirectly controls the second D-valve.

Referring to Figs. 5–8, a piston carrier in the form of a one-piece member 45 mounts leather cup-shaped piston heads 41 and 42 at either end, and as will be clear from Figs. 4 and 8, these piston heads are free to make a tight-fitting slide in the bores of the respective piston cylinders 40 and 43. Each piston arrangement is the same, and as shown in Fig. 8, a depending flange as 44 is formed at either end of the piston carrier. The piston head or disc as 41 is retained between this flange and a flat plate 46 as by a pair of screws 47. Positioned between flange 44 and the inner face of the piston head, is a thin plate 48 formed so as to provide an annular channel in which an annular spring 49 is adapted to be seated in position to urge the flange portion of the piston head into an air tight engagement with the bore of the piston cylinder 40. As best shown in Fig. 12, the base member 20, in which the ports of the D-valves are located, is machined along two portions of the top to provide two flat tables 50 and 51, and a recess 52 is afforded therebetween. These tables 50 and 51 define the general location of the aforementioned D-valves, and valve discs are adapted to slide thereon. Each of the flanges 44 depending from either end of the piston carrier 45 is formed with a projecting bushing 54 for receiving the ends of a shaft 53 which extends transversely to the base member 20 and within the area of the recess 52 provided therein. Intermediate the ends of shaft 53 and freely journaled for sliding movement thereon, are a pair of headed sleeves 55 and 56, opposed one to the other. A pair of compression springs 57 and 58 are mounted concentric to shaft 53, and are each positioned between the bushings as 54 and the heads of sleeves 55 and 56 so as to be capable, when compressed, of exerting a force against the heads of these sleeves for cooperating with other parts to actuate a carrier for the valve disc of valve 35 that determines movement of the piston carrier.

The piston carrier 45, somewhat yoke-shape in outline, is formed at its forward end with a downwardly off-set projection which functions as a carrier for the valve disc of valve 25, and an opening 59 is provided therein. Seated within the opening 59 is the head of a valve disc 60 bottom portions of which rest on table 51 for sliding movement thereon, and it is this valve disc which cooperates with three valve ports to alternately pulse vacuum to the lines connected to the milking cups. The other or rearward end of the piston carrier 45 is formed with a ratchet means 61 that embraces arms as 62 of a yoke member 63, the latter being pivotably mounted on the top of base member 20 by means of a pin 64, threadably retained in the base member 20. Mounted for sliding or shifting movement on and relative to table 50, and underlying the rearward portion of the piston carrier 45, is another valve disc carrier 65 pivotable on a pin 66 threadably retained in base member 20. This latter carrier is formed with an opening in which is seated a valve disc 67 adapted to slide on table 50 for cooperating with three other valve ports of a D-valve 35 to control movement of the piston carrier through vacuum pulses established in the bores of the piston cylinders behind the piston heads. The valve disc carrier 65 is formed at one end with a projection 68 which overlies the free portion of shaft 53 in position to be engaged by one or the other of the heads on sleeves 55 and 56. The other end of carrier 65 is generally fan-shape in outline and, as best shown in Figs. 5A and 7A, is formed with a small projection 69 intermediate two associated cam surfaces 69A and 69B. Mounted below and positioned between the arms 62 of yoke member 63 is a projecting stud 70, Figs. 5A and 7A, in position to ride on one or the other of the cam surfaces 69A and 69B. Since stud 70 is integral with the pivotable yoke member 63, and since the arms 62 of the latter are embraced by the ratchet 61 on piston carrier 45, it will be seen that movement of the latter causes stud 70 to ride on one or the other of the cam surfaces 69A and 69B.

The milking device of the present invention is adapted to conduct vacuum from a pump of a known type to lines which terminate in milking cups of a known type attached to the teats of the cow, and to this end an elongated nipple 21 is threaded in a bore provided in base member 20 at the rearward end thereof. It will be appreciated that base member 20 is adapted to be set on the open end of a milk container in an air-tight fashion, and for this purpose a resilient gasket 30 is provided at the bottom of base member 20. Nipple 21 is formed with a central passage 22 which registers with another passage 22A in base member 20, the latter passage opening into a relatively large cavity 23 provided in the bottom of base member 20. Leading from the top of cavity 23 at the forward end is a port 24 extending vertically of base member 20, and this port opens at the top of table 51. Opening at the forward end of base member 20, and opening at the top of table 51 on either side of port 24, are a pair of ports 26 and 27. These latter two ports connect, respectively, with passages 28A and 29A provided, respectively, in elongated nipples 28 and 29 threaded in bores provided at the forward end of the base member 20. The three ports 24, 26 and 27, which open in table 51, together with the valve disc 60 adapted to slide thereabove on table 51 in accordance with the movement of piston carrier 45, constitute a D-valve generally indicated at 25. In this connection, it will be observed that valve disc 60 is provided on its underside with a recess 60A of a size that affords communication between ports 24 and 26 on one hand, and ports 24 and 27 on the other hand when valve disc 60 is in a limiting left and right position, respectively, on the table 51, when viewed from Fig. 10A. Also, the recess 60A is of such size as to assure sealing off of the ports 26 and 27 relative to port 24 when the valve disc 60, carried by the piston carrier 45, is in a central position relative to the table 51. In this connection, it will be recalled that reference was earlier made to left and right limiting positions of the counter arm 81 as well as to a central or intermediate position thereof, and these three positions of the counter arm 81 coincide with the above-mentioned three positions of the valve disc 60. The significance of this coincidence in positioning will be pointed out later when the operation of the present device is considered as a whole, and for present purposes it is sufficient to consider only the left and right limit positions or settings of the D-valve 25.

Considering the other of the two D-valves, a central port 31 leads from the top of table 50 downwardly through base member 20 and opens into cavity 23 above the opening of passage 22A. As best shown in Fig. 9, two other ports 32 and 33 of this D-valve open at the top of table 50 on either side of port 31 and lead laterally through base member 20 to open at points on the sides thereof. When the piston cylinders 40 and 43 are in position on the side of base member 20 as shown in Figs. 9 and 11, the ports 32 and 33 communicate, respectively, with passages 38 and 39 which extend through the sides of the piston cylinders 40 and 43 and open internally at the closed ends 40A and 43A thereof. Being similar to D-valve 25, the three ports 31, 32 and 33, together with the valve disc 67 which is adapted to slide there above on table 50, constitute a second D-valve generally indicated at 35, and it is this D-valve which controls pulsing or shifting movement of the piston carrier 45 which, in turn, accordingly positions the valve disc 60 of D-valve 25 relative to the ports 24, 26 and 27. As shown in Figs. 11 and 11A, valve disc 67 assumes left and right limit positions being similar, in this respect, to valve disc 60, and the recess 67A is of such size as to assure communication between ports 31 and 32 on one hand and ports 31 and 33 on the other hand when the valve disc 67 is in a left and right limit position respectively. In this regard, it should be pointed out that with respect to their left and right limit positions, the two valve discs 60 and 67 do not coincide, that is to say, these valve discs are on a diagonal line in their respective limit positions rather than on a straight line relative to the planes of tables 50 and 51. From the foregoing it will be seen that ports 32 and 33 and the passages 38 and 39 which are adapted to communicate therewith, are communicable with central port 31 when the recess 67A of valve disc 67 straddles port 31 and one or the other of ports 32 and 33 as best shown in Figs. 11 and 11A.

In this manner, a vacuum which is establishable in port 31 can also be established in one or the other of the piston cylinder bores according to the limit position assumed by valve disc 67. In order that port 31 may be adjustable, a tapered valve member 34 is provided at one end with a wedge-shaped valve opening 34A. This valve member is inserted in a bore that intercepts port 31 internally in base member 20. The valve member 34 is of a known type and is adapted to be retained in position as by a lug 36, Fig. 4, the free end of which is pivotable into an annular groove 37 adjacent the head of the valve member as best shown in Fig. 9A.

It should be clear from the foregoing that all shifting or pulsing movement of the piston and D-valve arrangements is adapted for vacuum actuation. When the base member 20 is set on the open end of a milk container in an air-tight manner, any vacuum applied to the nipple 21 is established in the cavity 23 of the base member through communicating passages 22 and 22A. Cavity 23 is unobstructed, and this vacuum will also be established in the central ports 31 and 24 of the D-valves 35 and 25 respectively. For present purposes of discussion, it can be assumed that the pistons and valves are in the positions shown in Figs. 4 and 5 wherein the piston head 41 has been fully stroked inwardly of piston cylinder 40 toward the closed end 40A thereof, while piston head 42 is in a limit position adjacent the open end of cylinder 43 flush against the side of base member 20. This inward or left limit position of the piston head 41, and therefor of the piston carrier 45, places valve disc 60 in a corresponding left limit position whereat port 26 is in communication with central port 24 through the recess 60A in the bottom of valve disc 60 as best shown in Fig. 10A. It will be appreciated that the annular portion of valve disc 60 which surrounds the recess 60A seals ports 24 and 26 against the atmosphere. As indicated in Fig. 10A and as shown in Fig. 5, port 27 of D-valve 25 is open to the atmosphere when the valve disc 60 is in its left limit position, and since port 27 is not in communication with port 24 there will only be air in port 27 and the passage 29A associated with the nipple 29. On the other hand, there is a vacuum in port 24, and due to the position of recess 60A in valve disc 60 this vacuum is also established in port 26, and the passage 28A, associated with the nipple 28. As a consequence, nipple 28 will receive vacuum and milk will spill into cavity 23 through passage 28A, port 26, and port 24. This much describes the action at D-valve 25 when the valve disc 60 is in its left limit position, and in the meantime, the action at D-valve 35 is as follows. The relative positioning between the two valve discs 60 and 67, when the piston carrier 45 is in the position shown in Figs. 4 and 5 is best illustrated in Figs. 10A and 11. Thus, when the piston carrier 45 is in such position relative to the tables 50 and 51 that piston head 41 is displaced inwardly of its piston bore, while piston head 42 is displaced outwardly of its bore, ports 24 and 26 of D-valve 25 are in communication while ports 31 and 33 of D-valve 35 are in communication through recess 67A provided in the bottom of valve disc 67 as shown in Fig. 11. It will be appreciated the peripheral portion of valve disc 67 surrounding the recess 67A is of such size and area to assure sealing off of ports 31 and 33 against the atmosphere, and therefore the vacuum in port 31 is also established in port 33. On the other hand, valve disc 67 is of such size as to completely expose port 32 to air as indicated in Fig. 11. It will be recalled that port 33 leads from its opening in table 50, at a point beneath the recess 67A in valve disc 67, to an opening on the side of base member 20 and there registers with a passage 39 in piston cylinder 43 that opens internally of the bore at the closed end 43A thereof. Consequently, the vacuum in port 33 will be established in that displaceable volume of the bore of piston cylinder 43 lying between the closed end 43A and the associated piston head 42. As a consequence, the pressure in the displaceable volume of cylinder 43 will correspond substantially to that of the vacuum, but on the other hand, the pressure in piston cylinder 40 will be at atmosphere since port 32 which communicates with passage 38 is open to air at this time as shown in Fig. 11.

From the above, it will be seen that when the valve discs 60 and 67 are in their left and right limit positions respectively, as shown in Fig. 5, any vacuum in the cavity 23 of base member 20 is effective in the passage 28A in nipple 28. At the same time, the positioning of valve disc 67 and the recess 67A therein determines the establishment of a vacuum in the displaceable volume of the bore of piston cylinder 43. Under this condition, and as shown in Figs. 5 and 5A, the head of sleeve 56, freely slidable on the shaft 53 extending between the two piston heads, is in engagement with the projection 68 provided at one end of the valve disc carrier 65, and spring 58 which cooperates with this sleeve is compressed. Ratchet 61 on the piston carrier 45 has positioned the yoke member 63 in a lowermost clockwise position as viewed in Figs. 5 and 5A, and the stud 70 on this member is in position to ride on the cam surface 69B of the valve disc carrier 65. It will be recalled that both the yoke member 63 and the piston carrier 65 are pivotable on pins 64 and 66 mounted in base member 20. Aside from the action of spring 58A and another spring 94 later to be considered, the only impediments to movement of the piston carrier 45 relative to the tables 50 and 51 are sliding surfaces, and consequently the vacuum established in the bore of piston cylinder 43 as a result of the right limit position of valve disc 67 is effective to draw piston head 42 toward the closed end 43A of piston cylinder 43. Movement of piston head 42 in this direction is, of course, accompanied by a similar directional movement of the piston carrier 45, and at the commencement of such movement ratchet 61 bears against the arms 62 of yoke member 63, pivots the latter on pin 64 in a clockwise direction as viewed from Fig. 5, and lug 70 starts to ride clockwise on cam surface 69B, as viewed from Fig. 5A, toward projection 69 at the end of the valve disc carrier 65. In the meantime, spring 58 gradually expands, reducing the force which it exerts against the head of sleeve 56; and the head of sleeve 55, against which one end of spring 57 abuts, moves toward the projection 68 of carrier 65. It will be appreciated that until the head of sleeve 55 engages a lateral side of projection 68, the suction at valve 25 is sufficient to maintain carrier 65 in its right limit position and vacuum continues to be applied to the displaceable volume in the bore of piston cylinder 43 which is now being gradually reduced. As piston head 42 continues its movement toward the closed end of cylinder 43 under the influence of vacuum, ratchet 61 continues to pivot lug 70 clockwise along cam surface 69B, and the head of sleeve 55 finally engages the lateral side of projection 68. Spring 57 thereupon starts to compress against the head of sleeve 55 and tends to urge carrier 65 clockwise about its pivot pin. At the time of engagement between the head of sleeve 55 and projection 68 of carrier 65, lug 70 is approximately at the midpoint on cam surface 69B; consequently, as movement of the piston carrier continues to compress spring 57 between the bushing 54, Fig. 8, and the head of sleeve 55 which now is in engagement with the lateral side of projection 68, lug 70 exerts a restraining action on valve disc carrier 65, and the latter is held in the position shown in Fig. 11 determinative of communication between ports 31 and 33 and continuance of the vacuum in the now further reduced displaceable volume of the bore in piston cylinder 43. Continued movement of the piston carrier 45 toward the closed end 43A of cylinder 43 pivots lug 70 clockwise beyond the midpoint of cam surface 69B, and spring 57 continues to be compressed as before. Once the piston carrier 45 has been vacuum-actuated to such an extent that lug 70 is moved beyond the juncture between projecting end 69 and cam surface 69B of the carrier 65 to assume what may be termed its enabling position, all restraining action on carrier 65 by lug 70 is removed, compressed spring 57 expands instantly against projecting end 68, and the carrier 65 is instantly snapped clockwise as viewed in Fig. 5, about its pivot pin 66. Such snapping action of the carrier 65 slides the valve disc 67 laterally on table 50 toward port 32 and port 31 is opened to air, interrupting the vacuum in the bore of cylinder 43, and movement of the piston carrier 45 toward the closed end of cylinder 43 is instantly stopped at the right limit position shown in Fig. 7.

All the time, movement of the piston carrier 45 in the direction of the closed end of piston cylinder 43 is accompanied by sliding movement of the valve disc 60 along the table 51 and in the same direction. This eventually results in an opening of port 26 to the air whereby the teat cups corresponding to nipple 28 and passage 28A no longer receive vacuum. The right limit position of valve disc 60 as determined by the snap movement of the carrier 65 in a clockwise direction as viewed in Fig. 5 locates the recess 60A of valve disc 60 in straddling relation over ports 24 and 27 of D-valve 25, and these two ports are thereupon rendered communicable. The vacuum in cavity 23 of base member 20 is continuous. Consequently vacuum will be established in the passage 29A of nipple 29, and the teat cups in the lines corresponding to nipple 29 will receive vacuum.

It will be clear that the passing of lug 70 beyond the aforesaid juncture to its enabling position, snap movement of the carrier 65, opening of port 33, and interruption of the movement of piston carrier 45 all occur simultaneously. It is this snap movement of carrier 65 clockwise from the position in Fig. 5 to the position in Fig. 7 that enables or produces return movement of the piston carrier from the right limit position shown in Fig. 7 back to the left limit position of Fig. 5. Such return movement of the carrier 45 is instituted through the D-valve 35 as follows, and is aided by a spring 94 the action of which will be considered later. The enabling position of lug 70, is best shown in Fig. 7A which corresponds to Fig. 7. Thus, when the carrier 65 is snapped clockwise by spring 57 expanding against the head of sleeve 55, snap movement of the carrier is limited by the tip of cam surface 69A engaging lug 70 at the enabling position of the latter. This left limit position of carrier 65 is illustrated in Fig. 7, and the recess 67A in the bottom of valve disc 67 renders ports 31 and 32 communicable as shown in Fig. 11A, port 33 of D-valve 35 now being open to air. The vacuum established in port 31 is continuous at all times, and consequently vacuum will be established in port 32 and therefore in passage 38 leading through the lateral side of piston cylinder 40 and opening interiorly of the bore adjacent the closed end 40A thereof. Since the piston carrier 45 is in the position shown in Fig. 7 at this time, it is now the volume of piston cylinder 40 lying between the closed end 40A thereof and the piston head 41 that is displaceable and the vacuum in passage 38 is established therein. Since port 33 is open to the air, atmospheric pressure is now existant at all points in the bore of piston cylinder 43 so that the piston carrier 45 will now be actuated by the vacuum pull at the rear of piston head 41. Thereupon, piston head 41 commences return movement toward the closed end 40A of piston cylinder 40, ratchet 61 commences to pivot the lug 70 of yoke member 63 counter-clockwise on cam surface 69A as viewed in Figs. 7 and 7A, and the head of sleeve 56 is brought to bear against the projecting end 68 of the carrier 65. Spring 58 compresses in a manner similar to that previously described for spring 57 as the piston carrier continues its return movement toward the position in Fig. 5, and lug 70 now riding on the cam surface 69A restrains carrier 65 in its left limit position against the action of spring 58. Finally, ratchet 61 carries lug 70 past the juncture between cam surface 69A and projecting end 69 of the valve disc carrier 65. Since lug 70 is now located in its other enabling position, spring 58 is unrestrained by lug 70 engaging cam surface 69A and is effective to pivot carrier 65 counter-clockwise as viewed in Fig. 7. The positioning of lug 70 is that shown in Fig. 5A whereat the tip of cam surface 69B engages therewith to accurately position carrier 65 in its right limit position with recess 67A of the valve disc in straddling relation back over the ports 31 and 33 of D-valve 35. A vacuum is once again established in piston chamber 43, port 32 is again opened to the air, and a cycle of operation has been completed. During return movement of the carrier 45 from the position in Fig. 7 to that in Fig. 5, the valve disc 60 of D-valve is displaced from over port 27 and moved back along table 51 toward its left limit position in Fig. 5.

Having considered a complete cycle of operation, it will be seen that the milking device of the present invention embodies a shiftable or pulsating motor actuated through a cycle of operation from one limit position to another and then back by means of a first valve arrangement which is adapted to supply alternating actuating vacuum pulses to the motor by means of one and then another valve setting. In turn, the motor controls a second valve arrangement having one port or opening connected to vacuum to supply vacuum to a corresponding teat cup line when the motor is at one limit position, and having another port or opening which is connected to vacuum to supply vacuum to another teat cup line when the motor is at its other limit position. Moreover, a shiftable valve member for connecting these latter ports to vacuum is carried by the motor, and the motor itself controls means that enable the first valve arrangement to produce pulsing or shifting of the motor between its limit positions. One cycle of operation of the pulsing motor, more specifically comprising a pair of pistons alternately actuated first in one direction and then in another by vacuum pulsed into the respective piston cylinders, is accompanied by one vacuum pulse in each of the teat cup lines. The present device embodies a counter mechanism for counting such cycles so that the number of cycles corresponds to the number of pulses in each of the teat cup lines. Since the valve arrangement for pulsing vacuum to the teat cup lines is provided with an intermediate setting which holds the vacuum in the teat cup lines, lock means are also provided which interrupt the counter at a predetermined number of cycles, and this lock means cooperates with the means that enable and produce pulsing of the shiftable motor to maintain the valve setting in its aforesaid intermediate position.

The counter mechanism of the present invention is illustrated in Figs. 13–19 and comprises a counter arm that shifts cyclically from one limit position to another and then back in accordance with the cyclic shifting of the motor hereinbefore considered. A set of counting means which register the number of such cycles, or the number of pulses in each of the cup lines, is controlled, through an escapement means, by the movement of the counter arm, that is to say, the units member of the counting means is shifted one unit for each movement of the counter arm from one limit position to another and then back. The counter mechanism also comprises carry-overs adapted to move the tens member of the counting means once each time the unit member passes a tens position, and the hundreds member once each time the tens member passes a hundreds position. Insofar as the counting means are concerned, it will be appreciated that elimination or addition of members may be made as desired or needed.

Movable with the members comprising the counting means are settable means adapted to be set in predetermined positions corresponding to the predetermined number of milking pulses desired in the teat cup lines, and when these settable means register one with another, means are actuated which lock the members of the counting means in such a manner that complete shifting of the counter arm throughout another cycle is prevented. Accordingly, the counter arm is held in an intermediate position that maintains an intermediate position of the motor which in turn is determinative of the aforesaid intermediate valve setting that holds the vacuum in the lines terminating in the cups attached to the teats of the cow. Such automatically actuatable lock means may be in the form of a sensing means that senses the settable means as will be clear from the detailed disclosure below.

The counter mechanism is generally indicated at 90, Fig. 1, and is mounted atop the hood or cover 76 that overlies the piston and valve arrangement. Reference was earlier made to a plate 80 fixed at one end to the piston carrier 45. This plate protrudes through a slot 85 at the rear end of the hood and is yoked as at 82 so as to engage one end of pin 72 fixed to the lower end of the counter arm 81. The counter arm 81 is shiftable or free to rock in a manner as described below, and it will be clear that as the motor or piston carrier 45 shifts relative to the base member 20, plate 80 also shifts in the slot 85. The counter arm 81 is releasably fixed to and adjustable on the end of a bushing 88 in known manner as by screws 84 and 86. This bushing 88 receives one end of a shaft 83 which is keyed thereto in a known manner so that movement of arm 81 and bushing 88 is imparted to shaft 83. As best shown in Fig. 13 which is a view looking into the back of the counter mechanism, this shaft 83 extends between and is freely journaled in opposite ends of the counter housing 92 for rocking movement. As best shown in Fig. 13, one end of a coil spring 94 is retained in position on the outside of the counter housing 92 as by a screw 93, and the other end of this spring engages a pin 95 fixed on the bushing 88. This spring 94 is effective to urge the counter arm 81 in a clockwise direction as viewed in Fig. 4, or in other words, spring 94 tends to position and hold the piston carrier in its left limit position shown in Fig. 4. Shaft 83 mounts pawl means for actuating the counting means and also mounts a pair of carry-over gears 156 and 176.

Mounted above shaft 83 is a second shaft 86 which extends between opposite ends of the counter housing and is freely journaled thereat. This shaft 86 in addition to mounting the counting means, mounts escapement means that are adapted to rotate or shift the counters step-wise, carry-over means rotatable with the counters, and means settable at predetermined positions to cooperate with a lock means to interrupt movement of the counters on shaft 86. The counting means Fig. 13, comprises a units disc 140, a tens disc 160 and a hundreds disc 180, and these discs are adapted to be shifted or moved step-wise in the shaft 86 through a ratchet 120 of an escapement in a manner to be described hereinafter. Rotatable on the shaft 86 in a step-wise manner with the counter discs 140 and 160, are a pair of carry-over discs 145 and 165 provided with carry-over ratchets as 146 and 166 that are adapted to engage the carry-over gears 156 and 176 respectively. Three other discs 150, 170 and 190 are provided, and these three discs are formed with notches as 151, 171 and 191 that cooperate with the lock bar 100 in a manner to be described below.

The units disc 140 of the counter means is adapted to be moved one unit, as recorded by the digits shown thereon, for each cyclic movement of the counter arm 81 as the latter shifts from one limit position to another limit position and then back. To this end, the ratchet 120 is freely rotatable on the shaft 86 and is provided at one end with a plate or disc 121 fixed thereto. On the side away from the ratchet 120, plate 121 is provided with pins 122 and 123 that seat in openings (not shown) provided in another plate 129 which is positioned on shaft 86 between plate 121 and the units disc 140. The plate 129 is free to rock or shift on shaft 86, and as will be more specifically described later, plate 129 is so mounted in the units disc 140 that when ratchet 120 is rocked on shaft 86 such movement is imparted to the units disc through plates 121 and 129 and the pin connection therebetween. Ratchet 120 is rocked on shaft 86 in accordance with the cyclic shifting of the counter arm 81 as follows.

Referring now to shaft 83, it will be recalled that this shaft is mounted for rotation or rocking movement in the counter housing 92, and it will be seen that this shaft is adapted to be rocked from one position to another and then back as the counter arm 81 is shifted between limit positions accordingly as the motor or piston carrier 45 shifts between limit positions. Fixed or keyed to shaft 83 for rocking movement therewith are a pair of plates 110 and 112, and positioned on shaft 83 between these plates are two pawl arms 115 and 116 provided with pawl teeth as at 115B and 116A adapted to engage teeth as 120B and 120A, respectively, formed on the ratchet 120. Another pawl 111 is formed at the end of plate 112 as shown in Fig. 14. The pawl arms 115 and 116 are freely journaled on the shaft 83, and are each formed with an opening characterized by a generally vertical oval portion 118 and a generally horizontal ear portion 117. A pin 119 is fixed to and extends between the two plates 110 and 112 in coaxial relation to the slots as 117. A spring 114 is tensioned between the tips of the pawl arms 115 and 116 so as to draw the pawl arms toward one another in embracing relation about the ratchet 120, and a pin 113 fixed on the counter housing is adapted to position and guide pawl arm 115 during its movement as will be pointed out below.

Fig. 14 shows the counter arm 81 in the limit position it assumes when the piston carrier 45 assumes the limit position shown in Figs. 4 and 5, that is to say, the limit position it assumes immediately prior to the commencement of cyclic movement of the piston carrier 45 hereinbefore considered. Under such conditions the pawl teeth 115B and 116A are out of positive or actuating engagement with the teeth 120B and 120A of ratchet 120, and the tip of pawl arm 115 abuts against the pin 113. The pin 119 is positioned centrally of the slots as 118 when viewed from Fig. 14. When D-valve 35 is effective to actuate piston head 41 toward the closed end 43A of cylinder 43 and against the action of spring 94, the counter arm 81, Fig. 14, commences to shift or rock clockwise from its limit position in accordance with the movement of the now-actuated piston carrier 45. Shaft 83 and therefore the plates 110 and 112 fixed thereto are rocked clockwise by arm 81, and pin 119 starts to move along an arcuate path toward the closed ends of the slots 117. Pin 119, is of course, off-center on plates 110 and 112, consequently this pin will describe a downward arcuate path as the plates 110 and 112 continue to rotate clockwise with shaft 83, and the pawl arms are drawn downwardly relative to the ratchet 120 by pin 119, the slots as 118 permitting such movement of the pawl arms. Spring 114 draws the pawl arms toward ratchet 120 in abutting relation, and just as the counter arm 81 reaches its intermediate position shown by the dotted lines in Figs. 14 and 4, the tooth as 116A on the pawl 116 positively engages the tooth as 120A on the ratchet 120. In the meantime, the lower slope of tooth 115B has engaged the upper slope of tooth 120B on the ratchet and such engagement, during the time that pin 119 is effective to draw pawl 115 downwardly relative to ratchet 120, causes pawl 115 to pivot slightly in a clockwise direction, as afforded by the configuration of slots 117 and 118, so that the engaging surfaces of teeth 115B and 120B slide relative to one another. Engagement between the teeth 116A and 120A is, of course, afforded through the rocking movements of plates 110, 112 and the pin 119, and at the time of such engagement the pawl 111 is at the midpoint of its path, that is to say, the tip of pawl 111 is below and slightly to the left of the tip of tooth 120C on ratchet 120.

As the counter arm continues past its midpoint to the limit position shown by dotted lines in Figs. 4 and 14, tooth 116A on pawl 116 imparts a positive counter-clockwise movement to ratchet 120 rotatable on shaft 86, tooth 115B slides off tooth 120B as the ratchet rotates counterclockwise on shaft 86, and pawl 111 aligns itself with tooth 120C which now has been moved counterclockwise with ratchet 120. When the counter arm 81 finally reaches its limit position as defined by the limit position of the piston carrier 45 in Fig. 7, pawl 111 engages tooth 120C on the ratchet 120 and functions to retain ratchet 120 in position on shaft 86. Thus, when counter arm 81 moves from its intermediate dotted line position in Figs. 4 and 14 to the dotted line limit position, positive engagement of the teeth on pawl 116 with the teeth on ratchet 120 is effective to shift or rotate ratchet 120 through half a cycle on shaft 86. Such a half-cycle movement of ratchet 120 shifts the units disc 140 half way between one unit and another, and this movement of the units disc is effected through the plates 121, 129 and the pin connection therebetween. As was mentioned earlier the manner in which plate 129 is mounted on the units disc for imparting movement thereto will be described below.

Considering now the return movement of counter arm 81 as effected by the return movement of the piston carrier 45 from its position in Fig. 7 to that of Fig. 5, it will be recalled that tooth 115B slipped off tooth 120B as the ratchet 120 was rotated counter-clockwise half a cycle by pawl 116. During return movement of the counter arm 81, shaft 83 will be rocked counter-clockwise as will be plates 110 and 112. Pin 119 is carried in a corresponding direction, and both of the pawls 115 and 116 move upwardly relative to ratchet 120. It will be appreciated that spring 114 is effective at all times to draw both pawls 115 and 116 inwardly toward ratchet 120. During return movement, the teeth on pawl 116 simply slide on the related teeth of ratchet 120, but the upper surface or slope of tooth 115B on pawl 115 makes a positive or actuating engagement with the lower slope of the tooth 120B, and ratchet 120 is again rotated counter-clockwise on shaft 86, this time by pawl 115, to complete the other half of its cycle. Such positive engagement between teeth 115B and 120B, initially occurs at about the time counter arm 81 passes its intermediate position during return movement from the limit position shown in dotted lines in Fig. 14 toward the limit position shown in full lines, and the ratchet 120 is completely moved through its other half cycle just as the counter arm reaches its full line limit position. This second half cycle movement of ratchet 120, as with the first, is imparted to the units disc 140 through plates 121, 129 and the pin connection therebetween and the units disc 140 now registers a new whole unit at the moment ratchet 120 reaches the peak of its other half cycle. In this connection it should be pointed out that the tip of pawl 115 abuts against pin 113, Fig. 14, just as the units disc 140 registers a new whole unit, and pin 113 functions to prevent pawl 115 from turning ratchet 120 beyond the point which defines a new whole unit in the units disc 140.

From the foregoing, it will be seen that as the counter arm 81 moves from one limit position to another and then back in accordance with a similar cyclic movement of the motor, the counter arm controls means that shift or rock first in one direction and then another to shift the units member of the counting means from one whole unit to another, thus registering or counting the cyclic movement of the motor. In other words, the counting means register each pulse in the milking lines accordingly as movement of the motor determines such pulses. Since the counting means embodies members that register tens as well as hundreds, it is necessary that means be afforded to carry over tens from the units member and hundreds from the tens member. To this end, the tens disc 160 and hundreds disc 180 are each provided with gears as 161 and 181. These gears are mounted in the number discs 160 and 180 in such a manner that movement of the gear is imparted to the associated number disc. In this connection, plate 129 is mounted in the units disc 140 in precisely the same manner. Moreover, the other plates or discs associated with each of the number discs are similar in all respects and are mounted in the same manner relative to shaft 86. Therefore, the tens number disc 160 will be considered alone.

Referring to Figs. 16 and 17, the gear corresponding to disc 160 is in the form of flat plate or disc 161 formed with gear teeth as 162, and as shown in Figs. 13 and 15, the plate 129 carries no teeth. Secured to the inner side of gear 161 as by rivets 163 is a spring plate 164 formed with a pair of sp'rings as 167 and 168. It will be observed that the free end of each spring is in the form of a head as 167A and 168A, and it is these springs which mount gear 161 to the tens disc 160. To this end, the disc 160 is formed with an annular flange 169 which defines an annular cavity surrounding the bearing bushing 159 fast on the disc 160. Formed radially in flange 169 are ten notches as 169A, opposite ones of which are adapted to seat the heads 167A and 168A of the springs 167 and 168, and when these heads engage or seat in the notches as 169A it will be seen that disc 160 is adapted to be moved by gear 161. The mounting of gear 181 in the hundreds disc 180 is precisely the same, and the same is true for the mounting of plate 129 in the units disc 140.

As best shown in Figs. 16, 17 and 18, the tens disc 160, as with the other number discs, is freely rotatable about shaft 86 on its bearing bushing 159, and gear 161 is retained flush against one side of disc 160. Flush against the other side of disc 160 is another disc or plate 170 which is concentrically mounted on a sleeve 172 fast on the bearing bushing 159. This sleeve 172 is formed with ten notches as 170A adapted to seat the end of a set screw 173 extending radially through disc 170. Thus, by means of screw 173 set in a notch in sleeve 172, the settable disc 170 is adapted to rotate with the tens disc 160, and through the notch 171 constitutes part of the locking means that are adapted to lock the number disc 160 against rotation on shaft 86. In this connection it will be observed that disc 170 can be located at any one of ten positions on the sleeve 172 as defined by the ten notches 170A. Such positioning of disc 170 locates the notch 171 relative to the periphery of the tens disc 160. Settable discs 150 and 190, similar in every respect to the settable disc 170, are associated with the units disc 140 and the hundreds disc 180, and as best shown in Figs. 15 and 15A, each of the discs 150 and 190 is also formed with a notch, 151 and 191 respectively, which can be located relative to the outer peripheries of these units and hundreds discs. As will be described in more detail below, alignment of the three notches 151, 171 and 191 relative to lock bar 109, Fig. 15A, effects locking of all three number discs on shaft 86.

It will be seen that to this point, two discs or plates are associated with the number disc 160, namely, a gear 161 (which corresponds to plate 129 associated with the tens disc 140) which is adapted to move disc 160, and a settable disc 170 which is adapted to move with disc 160 but which can be shifted relative to disc 160 through the set screw 173. The last disc associated with the tens disc 160 is a carry-over disc 165 that is mounted on bearing bushing 159 and retained flush against one side of the settable disc 170 as by screw 158, Fig. 17. This screw 158 extends through sleeve 172 and into a portion of the tens disc 160 so that the carry-over disc 165 rotates step-wise in a unit fashion with the tens disc 160. A similar disc 145 rotates step-wise with the units disc 140 as the result of a similar mounting. A carry-over ratchet 166 is struck out from the free side of the carry-over disc 160, and a similar ratchet 146 is formed on one side of carry-over disc 145 that is associated with the tens disc 140. However, since no thousands member is afforded in the counting means, a carry-over ratchet need not be associated with the hundreds disc 180. As best shown in Fig. 13, two carry-over gears 156 and 176 are freely journaled on shaft 83, and these gears are each formed with wide teeth as 157 and narrow teeth as 155. Four each of such teeth are provided as best shown in Figs. 19 and 19A. When the gears 156 and 176 are at rest as shown in Fig. 13, the two uppermost wide teeth as 157 (one out of view) engage or embrace opposite sides of the carry-over discs 145 and 165 and hence are held against rotation on shaft 83 by these discs. This condition is best illustrated in Figs. 19 and 19A, and it will be appreciated that, as shown in Fig. 17, the carry-over discs and settable discs are of substantially the same diameter. On the other hand, under such conditions, the uppermost one of the narrow teeth as 155 on each of the gears 156 and 176 meshes with the teeth as 162 provided on the gears 161 and 181.

In Fig. 13, the two carry-over ratchets 146 and 166 are shown for purposes of clarity, two steps removed from a carry-over position, that is to say, the units disc 140, for instance, will have to be moved one unit on the shaft 86 before the carry-over pawl is stepped around to a carry-over position. It will be recalled that the carry-over disc 145 moves step-wise with the units disc 140 as the result of a connection thereto. Hence, alone unit movement of the units disc 140 from its position in Fig. 13, as effected through a cyclic movement of counter arm 81, steps the carry-over ratchet 146 to a position immediately adjacent the top-most narrow tooth 155 on the gear 156. Now, when the counter arm 81, Fig. 14, commences another cyclic movement and reaches its intermediate position and shifts on toward its dotted-line limit position, pawl arm 116 is effective to step the ratchet 120 counter-clockwise through half a cycle. Accordingly, the units disc 140 shifts or rotates through half a unit on shaft 86 and carries the lower tooth of ratchet 146 into abutting engagement with that part of the top-most narrow tooth 155 of gear 156 which is free of gear 161, and gear 156 effects a half-unit rotation of the tens disc 160. During such half-unit rotation of the units and tens discs, the top-most wide gear tooth 157 of the gear 156 is embraced at one end by the ratchet 146 and at the other end is moved into mesh with the gear teeth on gear 161, so that movement of units disc 140 through the other half of its unit rotation, as determined by return movement of the counter arm 81, causes ratchet 146, through gears 156 and 161 to effect the other half-unit rotation of the tens disc 160 on shaft 86.

It will be appreciated that carry-over to the tens disc 160 is not effected until after (assuming an initial zero position for the units disc 140) the units disc has been stepped around shaft 86 to a tens position. In a similar manner, there will be no carry-over from the tens disc 160 to the hundreds disc 180 until the tens disc has been stepped around shaft 86 to a hundreds position at which time carry-over is effected through ratchet 166 carried by the tens disc 160, gear 176 journaled on shaft 83, and gear 181 mounted in the hundreds disc 180. In order that a proper carry-over will be had, location of the carry-over ratchets 146 and 166 relative to the numbers on the number discs 140 and 160 depends upon the position from which the numbers are to be viewed and the position of the carry-over gears 156 and 176. Thus, in the present instance, wherein the gears 156 and 176 are in vertical alignment with the number discs, and the number discs in turn are to be viewed as shown in Fig. 1, the carry-over ratchets are positioned relative to the numbers on the number discs substantially as shown in Fig. 13.

From the foregoing, it will be seen that the counting mechanism embodies counting members and carry-over members, and that the counting members are moved by means cyclically operable in accordance with the cyclic movement of the motor or piston carrier. The members of the counting mechanism are adapted to count milking pulses up to 999 but it will be appreciated that a lesser or greater number of members may be used as desired. The present device also embodies means that are adapted to lock the counting members against movement at a predetermined number, and such locking interrupts pulsing of the motor in its aforementioned intermediate position whereat vacuum in the milking lines is maintained.

In the previous discussion of the plates or discs associated with each of the numbering discs 140, 160 and 180, mention was made of settable discs 150, 170 and 190 which, as was described in connection with the showing in Figs. 17 and 18, are each adapted to be set at any one of ten positions to locate notches 151, 171 and 191 relative to the numbers on the numbering discs. It is these locations of the notches 151, 171 and 191 relative to one another which determine the number of milking pulses at which locking occurs. Referring more specifically to Figs. 15, 15A, and 19 and 19A, a housing 101 is afforded at the front end of the counter housing 92. A lock bar or plate 100 is mounted in a suitable recess provided in the housing 101, and this bar is pivoted on a pin as 99 fixed in this recess. Coil springs as 96 and 97 tend to pivot the bar 100 counter-clockwise about its pin 99, when viewed from Fig. 19, toward the settable discs 150, 170 and 190. At its upper end, the lock bar 100 is formed with three projections or sensing elements 106, 107 and 108 corresponding to the notches 151, 171 and 191 formed in the settable discs. It will be seen that until all three notches as 151 are aligned in front of the sensing elements as 106 on the lock bar, as shown in Figs. 15A and 19A, the lock bar is retained in its non-actuated position shown in Figs. 15 and 19 in which case the free ends of these elements simply bear against one or another of the settable discs 150, 170 and 190. Thus, even though the notches 191 and 171 are aligned with the corresponding projections 108 and 107, projection 106 will continue to bear against the non-notched peripheral portions of the settable disc 150 as shown in Fig. 19 until such time as the notch 151 therein is stepped around into alignment with projection 106 as shown in Fig. 19A.

For purposes of understanding, locking herein is adapted to occur after one hundred and eleven pulses as indicated by the numerals in Fig. 1, and it will be appreciated that discs 150, 170, and 190 will have to be set accordingly. Again, as with the carryover ratchet, the location of the notches 151, 171 and 191 relative to the numbers on the number discs will depend upon the position in which the numbers are viewed and the relative location of the lock bar 100. In this connection, it should be mentioned that Fig. 19 corresponds to "zero" of the units disc 140 readable in window 101 of Fig. 1 whereas Fig. 19A corresponds to "one" of the units disc 140 readable in window 109.

In the present instance, the set screws as 173, Figs. 17 and 18, are adapted to be set opposite the numbers corresponding to the predetermined number of milking pulses desired, as shown by the location of set screw 193 opposite "one hundred" on the hundreds disc 180. Similarly, the set screws corresponding to the settable discs associated with the tens and units discs will be set opposite "ten" and "one" respectively on the latter discs. As a result of such positioning of the set screws which seat in notches as 170A, Fig. 18, the notches 151, 171 and 191 will be located opposite "two hundred" on the hundreds disc, "twenty" on the tens disc, and "two" on the units disc. Under such conditions, and assuming that all number discs were set in "zero" positions readable through window 109 at the commencement of milking, in which case three "zeros" will appear in window 109, Fig. 1, notch 191, Fig. 15A will be set opposite projection 108 after the discs 170 and 160 count one hundred cyclic movements of the counter arms 81 and after such number has been carried over to disc 180 through the carry-over means 166—176. Insofar as the present predetermined number of one hundred and eleven pulses is being considered, the hundreds disc 180 will not move beyond the one hundred position which it now assumes. Similarly, after the units disc 140 has counted ten more cyclic movements of the counter arm 81, such number is carried over to the tens disc 160 and one hundred and ten pulses will register in window 101, Fig. 1. Lock bar 100 is still held in a nonactuated position since projection 106, Fig. 19, engages the non-notched periphery of settable disc 150. As was mentioned earlier, Fig. 19 corresponds to the "zero" of units disc 140 now readable through window 109.

It will be appreciated that the counting of one hundred and ten pulses occurs during the time counter arm 81 moves from its dotted-line limit position back to the full-line limit position shown in Figs. 4 and 14, to step units disc 140 from its half unit position between "nine" and "ten" all the way to "ten" ("zero"), causing the carry-over means 146—156 to carry "ten" over to the tens disc 160. Consequently, immediately after one hundred and ten pulses, piston head 41 assumes the position shown in Figs. 4 and 5, and valve disc 60 is in position to connect the milking line corresponding to nipple 28 to vacuum in the port 24 as shown in Fig. 10A. Valve disc 67 is in the limit position shown in Fig. 11, and vacuum is thereupon established in the bore of cylinder 43. Consequently, the piston carrier 45 is vacuum-actuated from left to right as viewed in Fig. 4 and against the action of spring 94 which tends to hold the counter arm 81 in its left or full-line limit position shown in Fig. 4. The piston carrier 45 continues the cyclic movement hereinbefore considered, and the counter arm 81 is accordingly shifted clockwise as viewed in Fig. 14. As the counter arm passes its intermediate dotted-line position, the ratchet 120 is actuated half a cycle by pawl arm 116, and units disc 140 is moved part way from "zero" toward "one" and assumes a halfway position therebetween just as lug 70, Fig. 5A, passes the juncture between cam surface 69B and the projecting end 69 on the valve disc carrier 65. During this half-unit movement of the units disc 140, the notch 151 in the settable disc 150 is advanced counter clockwise to a position halfway between the positional showings for this notch in Figs. 19 and 19A. It will be recalled that when lug 70 passes the juncture above, vacuum is immediately established in the bore of cylinder 40 by means of the snap action of carrier 65; and this defines the dotted-line limit position, and return movement of the counter arm 81. During return movement of the counter arm 81, the tooth 115B on pawl arm 115 positively engages the corresponding tooth on ratchet 120, and ratchet 120 is turned through the other half of its cycle on shaft 86. Accordingly, the units disc 140 is advanced on shaft 86 from its position half way between "zero" and "one" all the way to "one," and the notch 151, Figs. 19 and 19A, completes the other half of its movement toward projection 106 on the lock bar 100. All three projections 106, 107, and 108 on the lock bar 100 are now aligned with the notches 151, 171 and 191 of the settable discs, and lock bar 100 pivots on its pin 99, under the influence of springs. Thus, as the piston carrier 45 is vacuum-actuated toward the closed end 40A of cylinder 40 during its one hundred and eleventh cycle, as counted by units disc 140, the lock bar 100 is actuated from a position as shown in Fig. 15 to the position in Fig. 15A, and the notch in each of the settable discs 150, 170 and 190 is engaged by the corresponding projection 106, 107 and 108 of lock bar 100. Since the settable discs are fast to the number discs as shown in Fig. 17 the number discs are all locked against rotation on shaft 86 at the instant pawl 115 and ratchet 120 effect movement of the units disc 140 from half way between "ten" ("zero") and "one" all the way to "one." This occurs at the moment counter arm 81 is located in its full-line limit position, when the tip of pawl 115 abuts against pin 113 as was mentioned earlier.

It will be seen that since the units disc 140 is now locked against rotation on shaft 86, ratchet 120 is also locked. Therefore, pawl 116 will be ineffective to rotate ratchet 120; and in turn plates 110 and 112 which are fast on shaft 83 cannot be rocked beyond the point of engagement between the teeth on pawl 116 and the teeth on ratchet 120. It will be recalled that the teeth on pawl 116 do not positively engage the teeth on ratchet 120, until the counter 81 reaches its intermediate position. Thus, even though the number discs and ratchet 120 are locked against movement on shaft 86 at this time, the piston carrier is still free to be moved in the direction of the closed end of cylinder 43 to the extent that counter arm 81 reaches its intermediate position.

Thus, immediately after locking of the number discs, the piston carrier 45 is in the position of Fig. 5 and vacuum is pulsed to the milking line corresponding to port 26 of D-valve 25. Vacuum is established in the bore of cylinder 43 as defined by the snap action of valve disc carrier 65 immediately after the counting of the one hundred and eleventh pulse, because of the locking of ratchet 120, and piston carrier 45 moves toward the closed end 43A of cylinder 43. Such movement of the piston carrier continues until plate 80 locates the counter arm 81 in its intermediate position shown in Figs. 4 and 14. Counter arm 81 cannot move beyond this intermediate point and the piston carrier 45 is correspondingly maintained or held against the vacuum in cylinder 43 tending to draw the piston carrier beyond its intermediate position. Under such conditions, valve disc 60 straddles all three ports of the D-valve 25 as shown in Fig. 10 so as to seal all three against the atmosphere. This maintains the vacuum in the milking line corresponding to port 26. It will be appreciated that cyclic movement of the piston carrier 45 is quite rapid so that the vacuum pulses applied to nipples 28 and 29 through the sliding action of valve disc 60 on table 51 is never completely dissipated even though the ports 26 and 27 are normally alternately opened to the atmosphere during such cyclic movement of the piston carrier. In other words, when the valve disc 60 straddles all three ports at its intermediate position shown in Fig. 10, a slight vacuum, not quite as strong as that sealed off in port 26, is also sealed off in port 27. In this manner, the milking cups corresponding to both ports 26 and 27 are held in position on the teats of the cow. Under such circumstances, valve disc 67 of D-valve 35 assumes the position in Fig. 11 and is held in such position since, as it will be recalled, lug 70 has not passed the juncture between cam surface 69B and end 69 of the carrier 65 at the time valve disc 60 is in its intermediate position.

In order that the attendant will be warned of the completion of one hundred and eleven pulses, a bell 105, Figs. 15 and 15A, is located at the front of the housing 101. Extending laterally through housing 101 is an elongated pin 124 that carries a striker 125. This pin 127 is urged inwardly of the housing 101 as by a spring 126 so that, as shown in Fig. 13, one end normally abuts against a lateral side of the lock bar 100. When the lock bar 100 is actuated into a locking position as shown in Fig. 15A, pin 124 is actuated inwardly of housing 101 by the spring 126 and striker 125 sounds the bell 100. In this respect, pin 124 is so located that it functions to lock the lock bar itself when the latter is actuated.

It is of course necessary that the number discs be adapted for re-setting to "zero" positions. To this end, and as best shown in Fig. 16, shaft 86 is formed with right-angled channel 86A. Mounted within each number disc is a pawl 135, spring urged to a limit position about a pivot pin 136 fixed to the number disc, and the free end of such pawls are seatable within the channel 86A. As viewed from Fig. 16, it will be appreciated that the number discs as 160 are rotated counter-clockwise during counting in which case the pawls as 135 simply slide on the lower or lateral slope of channel 86A and step-wise about the periphery of shaft 86 which remains stationary in its bushings. On the other hand, when shaft 86 is itself rotated counter-clockwise by means as a wing-nut 137, the upper or vertical slope of channel 86A engages the free ends of the pawls 136 in their limit position and the number discs as 160 are carried counter-clockwise together about shaft 86. All three pawls as 135 are located the same relative to the numbers on the three number discs 140, 160 and 180 so that all members eventually align themselves during re-setting.

In connection with this re-setting, it will be recalled that mention was earlier made of the fact that the wide teeth as 157 on the carry-over gears 156 and 176 embrace or engage opposite sides of the carry-over discs 145 and 165. This condition is best illustrated in Figs. 19 and 19A, bearing in mind that the carry-over discs and settable discs are of substantially the same diameter. As a consequence, the carry-over gears 156 and 176 remain rotatively stationary or fixed on shaft 83 at least until the associated carry-over ratchets engage therewith, and in turn the gears 161 and 181 that are associated with number discs 160 and 180 are held rotatively stationary or fixed on shaft 86 due to the fixed position of the carry-over gears. Moreover, any tendency for ratchet 120 to be rotated frictionally by shaft 86 during the re-setting or counter-clockwise movement of the latter as viewed in Fig. 16, is resisted by the tooth 115B of pawl 115 engaging tooth 120B of ratchet 120 and by pin 113 bearing against the tip of pawl 115 as will be clear from Fig. 14. As a result, pins 122 and 123 which are carried by plate 121 fixed to ratchet 120 and which engage openings (not shown) in plate 129 mounted in the units disc 140, hold plate 129 against rotative movement on shaft 86. Since plate 129 and the gears 161 and 181 are held against rotation in this manner, the number discs 140, 160 and 180 will be forced to rotate with shaft 86 against the action of springs 167 and 168, Fig. 16, which are not strong enough to resist this forced movement of the number discs, and the heads as 167A and 168A progressively snap out of and engage opposite pairs of notches as 169A in the numbers discs as the latter are rotated counterclockwise by shaft 86.

While I have described the present invention from the standpoint of one particular structural embodiment, it will be appreciated that changes and modifications may be had as needed, and equivalent means substituted as desired, without departing from the principle of invention. I intend to be limited, therefore, only by the following claims which represent manifestations of the present inventive concepts and practices, distinguishing the same from others in the field.

I claim:

1. A vacuum-actuated milking device adapted to pulse vacuum alternately to one and then another conduit and comprising in combination, a motor cyclically shiftable by vacuum from one limit position to another and then back, a valve operated by and under control of the motor, the valve having one setting corresponding to the said one limit position of the motor whereat vacuum is adapted to be pulsed to the one conduit and having another valve setting corresponding to the said other limit position of the motor whereat vacuum is adapted to be pulsed to the other conduit, the valve having an intermediate position corresponding to an intermediate position of the motor whereat both conduits are closed to atmosphere to maintain vacuum in the lines, counting means arranged in said device and adapted to count the cyclic movements of the motor, means cyclically shiftable between limit positions with the motor for moving the counting means one unit for each cyclic movement of the motor, said last-named means having an intermediate position determinative of the said intermediate position of the motor, and means for locking the counting means at a predetermined number to maintain the means cyclically shiftable with the motor and the valve at the said intermediate positions thereof.

2. A vacuum-actuatable milking device adapted to connect one and then another conduit to vacuum and comprising in combination, a motor cyclically shiftable from a first position through an intermediate position to a second position and then back, a first valve operated by the motor for actuating the motor in alternate directions by means of vacuum, a second valve operated by and under control of the motor, the second valve having one position whereat vacuum is adapted to be operated to the one conduit and having another position whereat vacuum is adapted to be directed to the other conduit, the second valve having an intermediate position whereat vacuum is maintainable in both conduits, the said intermediate position corresponding to an intermediate position of the motor, and means for holding the motor at its intermediate position to thereby hold the second valve at its intermediate position; the last-named means comprising, a counter associated with said device and adapted to count the cyclic movements of the motor, means to lock the counter after a predetermined number of cyclic movements of the motor, and means operated by the motor to move the counter one unit for each cyclic movement of the motor.

3. A vacuum actuated milking device of the character described adapted to connect one conduit and then another to a source of vacuum and comprising in combination, an alternating piston-and-cylinder motor adapted to be cyclically actuated first in one direction and then in another by vacuum applied first to one cylinder and then another, a first valve controlled by movement of the motor and adapted to pulse vacuum first to one cylinder and then to another, a second valve operated by and under control of the motor to pulse vacuum first to the one conduit and then to the other, the second valve having an intermediate position corresponding to an intermediate position of the motor whereat the second valve is adapted to seal both conduits to atmosphere to maintain vacuum in both conduits, and means for holding the motor in the said intermediate position; the last-named means comprising, a counter means associated with said device and operated by the motor, and settable means for automatically locking the counter at a predetermined number.

4. A milking device having a conduit arranged thereon adapted to pulse vacuum to a conduit comprising in combination, a valve adapted to pulse vacuum to the conduit, the valve having one position whereat the conduit is adapted to be opened to a source of vacuum while closed to atmosphere, the valve having another position whereat the conduit is adapted to be momentarily opened to atmosphere while closed to vacuum, the valve having an intermediate position following upon the said one position whereat the conduit is closed to both atmosphere and vacuum, means for cyclically shifting the valve between the said one and said other position, and means for counting the cyclic movements of the valve and locking the same in the said intermediate position after a predetermined number of cycles; the last-named means comprising, a counter mechanism in said device adapted to count the cyclic shifting movements of the valve, means cyclically shiftable with the valve and being connected to the counter whereby the counter is shifted accordingly as the valve is shifted, and lock means adapted to be automatically actuated after a predetermined number of cyclic movements of the valve, the lock means when actuated being effective to hold the valve at the said intermediate position.

5. A milking device adapted to pulse vacuum first to one conduit and then to another comprising in combination, an alternating piston-and-cylinder motor, a first valve means adapted to be shifted by the motor for imparting vacuum pulses first to one cylinder and then to another, the first valve means being movable between limit positions, enabling means carried by the motor to enable the first valve to assume one and then another limit position, one cylinder being adapted to be connected to vacuum and the other to atmosphere when the second valve is at one or another limit position, a second valve operated by and under control of the motor to pulse vacuum to a conduit, the motor having an intermediate position whereat the second valve seals the conduit against both atmosphere and vacuum, and means for holding the motor at the said intermediate position, the holding means comprising a counter in the device settable to a predetermined number of milking pulses, and means in the counter for locking the motor at the said intermediate position thereof when the predetermined number of milking pulses has been obtained.

6. A milking device comprising in combination, a cyclically operable valve having a first position whereat a conduit is adapted to be connected with vacuum and closed to atmosphere, a second position whereat the conduit is adapted to be connected with atmosphere and closed to vacuum, and an intermediate position whereat the conduit is closed both to vacuum and atmosphere, lock means associated with the device for holding the valve means at the said intermediate position, and means associated with the device for automatically actuating the lock means after a predetermined number of cycles of the valve.

7. A milking device comprising in combination a cyclically shiftable valve means and a conduit associated therewith, the valve means having one position whereat vacuum is adapted to be directed to the conduit while the conduit is closed to atmosphere, the valve means having another setting whereat atmosphere is adapted to be opened to the conduit while closed to vacuum, the valve having an intermediate position whereat the conduit is closed both to atmosphere and vacuum, automatically actuatable lock means in the device adapted to hold the valve means at the said intermediate position, and means in the device for effecting actuation of the lock means after a predetermined number of cycles of the valve means.

8. In the device according to claim 7, the last-named means being in the form of a counter that is actuated one unit for each operating cycle of the valve.

9. In the device according to claim 7, the valve means being operated by and under control of a piston-an-cylinder motor, and a second valve means for imparting actuating vacuum pulses to the motor.

10. A milking device comprising in combination, a pair of conduits, a valve for pulsing milking vacuum first to one conduit and then to another, the valve having one limit position whereat the one conduit is momentarily adapted to be connected to vacuum and the other is open to atmosphere, the valve having another limit position whereat the one conduit is adapted to be momentarily open to atmosphere and the other is connected to vacuum, the valve having an intermediate position whereat both conduits are momentarily closed to both vacuum and atmosphere to seal vacuum therein, a motor in the device for shifting the valve between limit positions and passing through a position corresponding to the intermediate position of the valve, and means for holding the motor in its intermediate position.

11. In a milking device wherein milking pulses afforded by vacuum in milking conduits are controlled by a shiftable valve under control of a periodically operating actuating means and wherein the valve is adapted to maintain the vacuum in the conduits after completion of milking operation comprising, means for registering successive movements of the actuating means, means connecting the actuating means to the registering means whereby the actuating means is free to move accordingly as the registering means is free to move, and lock means in the device actuable after a predetermined number of movements of the actuating means to hold the valve in a position whereat vacuum is maintained in the conduits.

12. In a milking device wherein milking pulses afforded by vacuum in a set of conduits are to be controlled by a shiftable valve member under control of a cyclically operable actuating means, means for holding the vacuum in the conduits comprising, a shiftable valve having a first position whereat the conduits are momentarily connected to vacuum, the shiftable valve having a second position whereat the means are momentarily opened to atmosphere, the shiftable valve having an intermediate position whereat the conduits are momentarily closed to both vacuum and atmosphere immediately after being connected to vacuum, and means for holding the valve means in the said intermediate position; the last-named means comprising means in the device for registering the movements of the actuating means, means connecting the actuating means to the registering means whereby the actuating means are free to move accordingly as the registering means are free to move, and a lock associated with the registering means releasable after a predetermined number of movements of the actuating means to hold the valve in the said intermediate position.

13. In a milking device wherein milking pulses afforded by vacuum in a set of conduits are to be controlled by a shiftable valve member under control of a cyclically operable actuating means for holding the vacuum in the conduits comprising in combination, a shiftable valve having a first position whereat the conduits are momentarily connected to vacuum, the shiftable valve having a second position whereat the conduits are momentarily opened to atmosphere, the shiftable valve having an intermediate position whereat the conduits are closed to both vacuum and atmosphere immediately after being connected to vacuum, a lock means arranged in the device for holding the valve in the said intermediate position, and means for automatically actuating the lock means after a predetermined number of shifting movements of the valve means.

14. A milking device adapted to pulse vacuum to a pair of milking conduits comprising in combination, a valve cyclically shiftable from one position to another and then back to pulse vacuum first to the one conduit and then to the other, the valve having an intermediate position whereat both conduits are closed both to vacuum and atmosphere to maintain vacuum therein, means in the device for cyclically shifting the valve between the one position and the other, and means in the device for counting cyclic movements of the valve and for maintaining the valve in the said intermediate position; the last-named means comprising, a counter arranged in the device to count the valve cycles, means in the counter adapted to lock the counter a predetermined number of valve cycles as registered by the counter, means associated with the counter to hold the valve at the said intermediate position, and means in the counter adapted to actuate said holding means when the said predetermined number has been reached.

References Cited in the file of this patent

UNITED STATES PATENTS

| | | |
|---|---|---|
| 2,480,239 | Harstick | Aug. 30, 1949 |
| 2,524,755 | Bliss | Oct. 10, 1950 |
| 2,538,988 | Tobey | Jan. 23, 1951 |
| 2,573,927 | Orelind | Nov. 6, 1951 |